(12) United States Patent
Fischer

(10) Patent No.: US 11,579,295 B2
(45) Date of Patent: Feb. 14, 2023

(54) ASCERTAINING THE MAXIMUM RANGE OF A LIDAR SENSOR

(71) Applicant: Valeo Schalter und Sensoren GmbH, Bietigheim-Bissingen (DE)

(72) Inventor: Michael Fischer, Kronach Neuses (DE)

(73) Assignee: Valeo Schalter und Sensoren GmbH, Bietigheim-Bissingen (DE)

(*) Notice: Subject to any disclaimer, the term of this patent is extended or adjusted under 35 U.S.C. 154(b) by 429 days.

(21) Appl. No.: 16/637,148

(22) PCT Filed: Aug. 2, 2018

(86) PCT No.: PCT/EP2018/070935
§ 371 (c)(1),
(2) Date: Feb. 6, 2020

(87) PCT Pub. No.: WO2019/030093
PCT Pub. Date: Feb. 14, 2019

(65) Prior Publication Data
US 2020/0363528 A1 Nov. 19, 2020

(30) Foreign Application Priority Data
Aug. 9, 2017 (DE) .................... 10 2017 118 160.1

(51) Int. Cl.
*G01S 17/42* (2006.01)
*G01S 17/931* (2020.01)
(Continued)

(52) U.S. Cl.
CPC ............ *G01S 17/42* (2013.01); *G01S 7/4868* (2013.01); *G01S 7/497* (2013.01); *G01S 17/931* (2020.01)

(58) Field of Classification Search
None
See application file for complete search history.

(56) References Cited

U.S. PATENT DOCUMENTS 6,512,575 B1 1/2003 Marchi
2005/0180149 A1 8/2005 Albou et al.
(Continued)

FOREIGN PATENT DOCUMENTS

DE 10 2006 044794 A1 3/2008
EP 2482094 A1 8/2012
EP 2515143 A1 10/2012

OTHER PUBLICATIONS

International Search Report and Written Opinion in corresponding International Application No. PCT/EP2018/070935, dated Nov. 8, 2018 (12 pages).
(Continued)

*Primary Examiner* — Christopher G Findley
(74) *Attorney, Agent, or Firm* — Osha Bergman Watanabe & Burton LLP

(57) ABSTRACT

The invention relates to the ascertaining of the maximum range of a LIDAR sensor (2). According to the invention, there is provision, to this end, for a method of operation for a LIDAR sensor (2) having the following steps:
sending a LIDAR signal (4) at a predetermined normal power and receiving a back-scattered component of the LIDAR signal (4) with a predetermined normal sensitivity to ascertain the distance of objects (11, 12, 13, 14) present in the surroundings scanned by the LIDAR sensor (2) in a normal mode, characterized by
repeated interruption of the normal mode by a test mode, wherein the test mode comprises the following steps:
sending a LIDAR signal (4) at a test power, which is decreased by a predetermined amount in comparison with the predetermined normal power, and/or receiving the back-scattered component of the LIDAR signal (4) with a test sensitivity, which is decreased by a predetermined amount in comparison with the predetermined normal sensitivity, and ascertaining a value for the
(Continued)

Figure 1:
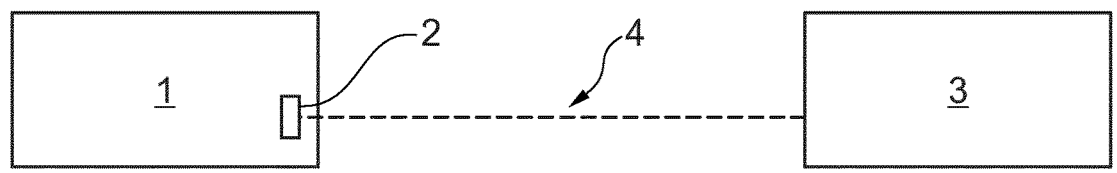

maximum range of the LIDAR sensor (2) that is available in the normal mode of the LIDAR sensor (2) on the basis of the distance, ascertained in the normal mode, of objects (13, 14) that are no longer detected in the test mode. This provides such an opportunity to ascertain the maximum range of a LIDAR sensor (2) as can be utilized simply, reliably and inexpensively.

9 Claims, 1 Drawing Sheet

(51) Int. Cl.
    *G01S 7/486*     (2020.01)
    *G01S 7/497*     (2006.01)

(56) References Cited

U.S. PATENT DOCUMENTS

2011/0149363 A1*   6/2011   Harris ............... G01S 17/95
2015/0138529 A1    5/2015   Singer
2019/0289238 A1*   9/2019   Ikuma ............... H04N 5/363

OTHER PUBLICATIONS

German Search Report in corresponding German Application No. 10 2017 118 160.1, dated May 28, 2018 (8 pages).

* cited by examiner

ASCERTAINING THE MAXIMUM RANGE OF A LIDAR SENSOR

The present invention relates to a method of operation for a LIDAR sensor having the steps of sending a LIDAR signal at a predetermined normal power and receiving a back-scattered component of the LIDAR signal with a predetermined normal sensitivity to ascertain the distance of objects present in the surroundings scanned by the LIDAR sensor from the LIDAR sensor in a normal mode.

Additionally, the invention relates to a LIDAR sensor for sending a LIDAR signal and for receiving a back-scattered component of the LIDAR signal so as, in a normal mode of the LIDAR sensor, to ascertain the distance of objects present in surroundings scanned by the LIDAR sensor from the LIDAR sensor, wherein the LIDAR sensor is configured such that the LIDAR signal is sent at a predetermined normal power in the normal mode and the back-scattered component of the LIDAR signal is received with a predetermined normal sensitivity.

It has already been known from practice for a relatively long time to use LIDAR sensors in vehicles, in particular for driver assistance systems, recently also increasingly as part of self-driving systems. As described e.g. in DE 10 2006 044 794 A1, a LIDAR sensor frequently has a laser operating as an infrared emitter in pulsed mode as transmitter, a photo-diode as receiver and evaluation electronics. The sensor performs a delay measurement for the transmitted infrared laser beams. The time that the laser light requires from the sensor to the irradiated object and back again is measured. The electronics then use this to calculate the distance to the object. In this way, a vehicle can e.g. adapt the distance from a vehicle in front without the driver needing to actively engage.

For safety reasons, however, it is important for the maximum range of the LIDAR sensor to be known. The reason is that if this maximum range is not known, then a situation can arise in which e.g. poor visibility, for example as a result of fog, means that the maximum range of the LIDAR sensor is significantly reduced, so that an object relevant to the vehicle is therefore not detected and hence "go ahead" is signalled. In other words: if a maximum range of over 200 m can be assumed for the LIDAR sensor when visibility is good, the fact that an object has not been detected within 200 m in front of the LIDAR sensor in poor visibility does not necessarily mean that there is actually no such object there. Instead, it may be that the maximum range of the LIDAR sensor is reduced to 50 m on account of the poor visibility, and objects further away are simply no longer able to be detected. For safety reasons, such a situation naturally needs to be known in order to be able to take preventive measures.

Fundamentally, the range of a LIDAR sensor can be determined from the characteristic of the light intensity of the back-scattered component of the LIDAR signal and the energy thereof. However, this requires complex conversion of the analogue signal into a digital representation having high temporal resolution, this being able to be performed only by using expensive analogue-to-digital converters. Alternative and cheaper designs for evaluating the received light impulse merely compare said light impulse with a threshold, which permits no statements about signal shape, however, and hence significantly hampers ascertainment of the maximum range owing to many unknowns.

Against this background, the invention is based on the object of providing such an opportunity to ascertain the maximum range of a LIDAR sensor as can be utilized simply, reliably and inexpensively.

The object is achieved according to the invention by the subject matter of the independent patent claims. Advantageous refinements of the invention are described in the subclaims.

According to the invention, there is therefore provision for a method of operation for a LIDAR sensor having the following steps:

sending a LIDAR signal at a predetermined normal power and receiving a back-scattered component of the LIDAR signal with a predetermined normal sensitivity to ascertain the distance of objects present in the surroundings scanned by the LIDAR sensor in a normal mode, characterized by repeated interruption of the normal mode by a test mode, wherein the test mode comprises the following steps:

sending a LIDAR signal at a test power, which is decreased by a predetermined amount in comparison with the predetermined normal power, and/or receiving the back-scattered component of the LIDAR signal with a test sensitivity, which is decreased by a predetermined amount in comparison with the predetermined normal sensitivity, and ascertaining a value for the maximum range of the LIDAR sensor that is available in the normal mode of the LIDAR sensor on the basis of the distance, ascertained in the normal mode, of objects that are no longer detected in the test mode.

A decisive aspect of the invention is therefore that the normal mode of the LIDAR sensor, in which the surroundings of the LIDAR sensor are scanned in order to ascertain the distance of objects therein from the LIDAR sensor, is repeatedly interrupted by a test mode. This test mode is used to ascertain a value for the maximum range of the LIDAR sensor in the normal mode.

This ascertaining of a value for the maximum range of the LIDAR sensor in the normal mode is effected by virtue of the power of the LIDAR sensor being reduced, that is to say the maximum range of the LIDAR sensor being actively decreased for a short time. The power of the LIDAR sensor can be decreased firstly by decreasing the transmission power and secondly by decreasing the reception sensitivity. While it is fundamentally sufficient either to decrease the transmission power or to decrease the reception sensitivity, it is naturally also possible for the transmission power and the reception sensitivity to be decreased at the same time. However, it is critical in this case for the decrease in the transmission power and the decrease in the reception power each to be made by a predetermined known amount to an appropriately known decreased test power or test sensitivity. In this context, it should be pointed out that it is admittedly preferred but not imperative for the LIDAR sensor to be operated at maximum power in the normal mode.

Decreasing the transmission power or the reception sensitivity by a predetermined amount of this kind permits objects that have still been detected in the normal mode but can no longer be detected in the test mode at the decreased transmission power or with the decreased reception sensitivity to be taken as a basis for inferring a value for the maximum range of the LIDAR sensor that is available in the normal mode. Worded differently: objects that can no longer be detected in the test mode can be taken as a basis for estimating the maximum range of the LIDAR sensor in the test mode and hence, owing to the known reduction in the power of the LIDAR sensor in the test mode, inferring a value for the maximum range in the normal mode.

Such a change from the normal mode to the test mode can take place e.g. several times in one second, so that a current value for the maximum range of the LIDAR sensor is always available virtually in real time. In this way, it is possible, likewise virtually in real time, to infer a decrease in the maximum range of the LI DAR sensor, e.g. as a result of adverse ambient conditions, and to react accordingly.

A fundamental advantage of the invention is that the solution is implementable purely by means of the programming of the sensor and hence does not result in increased production costs. Furthermore, the simplicity of the method of operation for the LIDAR sensor according to the invention allows the processor power of the LIDAR sensor to be reduced from time to time, which can firstly lower production costs and secondly allows a reduced power consumption during use in a vehicle.

The test power decreased in comparison with the normal power, and the test sensitivity decreased in comparison with the normal sensitivity, may be predetermined in different ways. In accordance with a preferred development of the invention, however, there is provision for the test power to be decreased to a predetermined proportion of the normal power and/or for the test sensitivity to be decreased to a predetermined proportion of the normal sensitivity. This means that, in accordance with this preferred embodiment of the invention, the transmission power or the reception sensitivity is reduced in the test mode to a predetermined percentage share of the power or the sensitivity in the normal mode. This has the advantage that absolute values for the transmission power or the reception sensitivity in the normal mode do not need to be known.

The value for the maximum range of the LIDAR sensor available in the normal mode of the LIDAR sensor, which has been ascertained on the basis of the distance, ascertained in the normal mode, of objects that can no longer be detected in the test mode, is preferably a lower limit for the maximum range of the LIDAR sensor in the normal mode. This lower limit indicates how far the maximum range of the LIDAR sensor in the normal mode extends with certainty.

In order to be constantly informed about the maximum range of the LIDAR sensor, the invention provides for the normal mode to be repeatedly interrupted by the test mode. The more frequently such an interruption occurs, the more it is possible to ensure that information about the maximum range of the LIDAR sensor is available virtually in real time. Therefore, in accordance with a preferred embodiment of the invention, there is provision for the normal mode to be interrupted by the test mode periodically, e.g. several times in one second.

Fundamentally, the data for ascertaining a value for the maximum range available in the normal mode of the LIDAR sensor on the basis of the distance, ascertained in the normal mode, of objects that are no longer detected in the test mode can be calculated using different methods. Preferably, however, data have been ascertained empirically beforehand for this purpose. In other words: prior to the actual operation of the LIDAR sensor, test measurements have been performed, during which it has been ascertained what the maximum range of the LIDAR sensor is if objects at particular distances from the LIDAR sensor have still been able to be detected in the normal mode, but no longer in the test mode. Such data can be stored e.g. in a table in order to be able to resort thereto during the actual operation of the LIDAR sensor. Further, the dependency of the distance of the objects no longer ascertained in the test mode on the maximum range of the LIDAR sensor can be described approximately by a formula, which is then used during the actual operation of the LIDAR sensor to ascertain a value for the maximum range in the test mode.

The invention also relates to the use of a method of operation, as described above, in a vehicle, in particular in a motor vehicle.

Furthermore, the invention relates to a computer program product for performing a method of operation for a LIDAR sensor, as described above.

Finally, the invention also relates to a LIDAR sensor for sending a LIDAR signal and for receiving a back-scattered component of the LIDAR signal so as, in a normal mode of the LIDAR sensor, to ascertain the distance of objects present in surroundings scanned by the LIDAR sensor, wherein the LIDAR sensor is configured such that the LIDAR signal is sent at a predetermined normal power in the normal mode and the back-scattered component of the LIDAR signal is received with a predetermined normal sensitivity, characterized in that the LIDAR sensor is additionally configured such that the normal mode is repeatedly interrupted by a test mode and that, in the test mode, a LIDAR signal is sent at a test power that is decreased by a predetermined amount in comparison with the predetermined normal power and/or the back-scattered component of the LIDAR signal is received with a test sensitivity that is decreased by a predetermined amount in comparison with the predetermined normal sensitivity and a value for the maximum range of the LIDAR sensor that is available in the normal mode of the LIDAR sensor is ascertained on the basis of the distance, ascertained in the normal mode, of objects that are no longer detected in the test mode.

Preferably, there is provision for the LIDAR sensor to be configured such that the test power is decreased to a predetermined proportion of the normal power and/or that the test sensitivity is decreased to a predetermined proportion of the normal sensitivity.

Furthermore, it is preferred for the LIDAR sensor to be configured such that the normal mode is interrupted by the test mode periodically.

Furthermore, in accordance with a preferred development of the invention, there is provision for a memory storing previously ascertained data for ascertaining the maximum range of the LIDAR sensor that is available in the normal mode of the LIDAR sensor on the basis of the distance, ascertained in the normal mode, of objects that are no longer detected in the test mode.

The invention also relates to a vehicle, preferably a motor vehicle, having a LIDAR sensor as described above.

The invention is explained in more detail below on the basis of a preferred exemplary embodiment with reference to the attached drawings. The features depicted can be an aspect of the invention either individually in each case or in combination.

Figure 2:
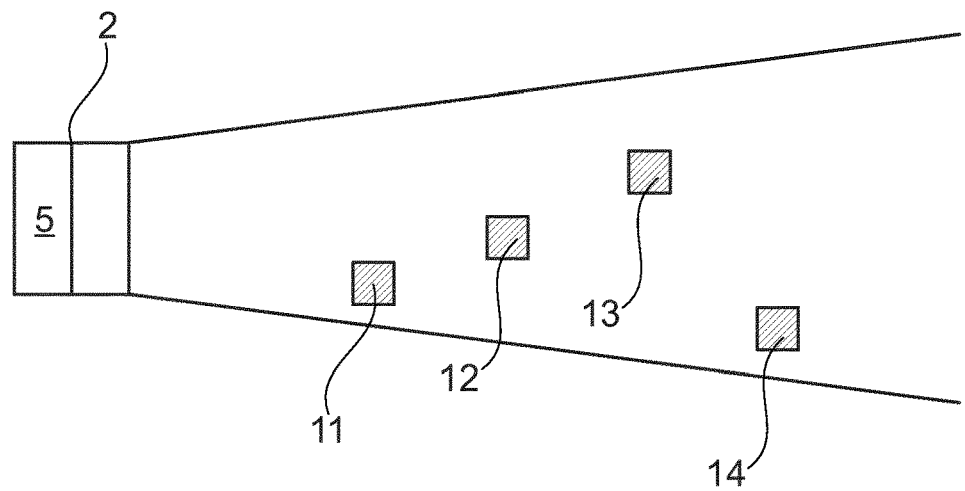
Figure 3:
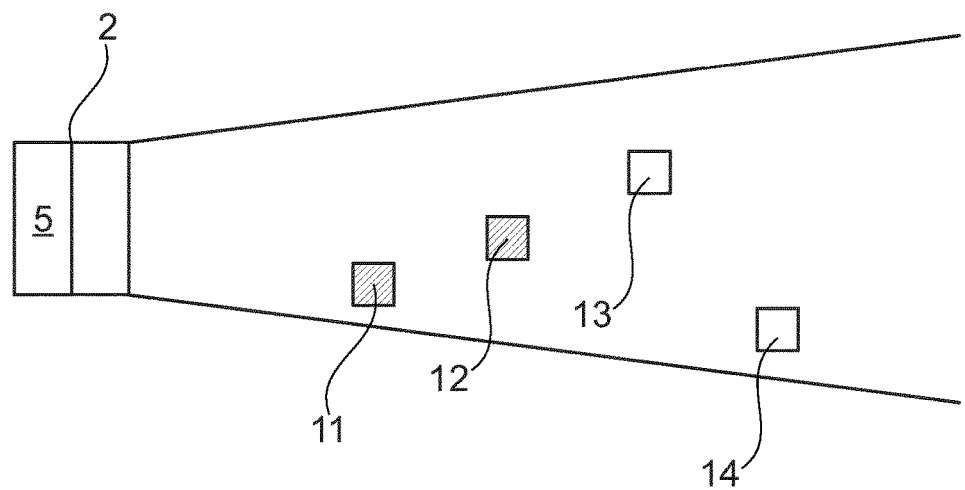

In the drawings,

FIG. 1 schematically shows a vehicle having a LIDAR sensor in accordance with a preferred exemplary embodiment of the invention, FIG. 2 shows a schematic depiction of the operation of the LIDAR sensor in accordance with the preferred exemplary embodiment of the invention in a normal mode, and FIG. 3 shows a schematic depiction of the operation of the LIDAR sensor in accordance with the preferred exemplary embodiment of the invention in a test mode.

FIG. 1 schematically shows a vehicle 1 equipped in its front region with a LIDAR sensor 2 in accordance with a preferred exemplary embodiment of the invention. Like a conventional LIDAR sensor, the LIDAR sensor 2 in accordance with the preferred exemplary embodiment of the invention is configured to send a LIDAR signal 4 and to receive a back-scattered component of the LIDAR signal 4 so as, during actual operation, called normal mode in the present case, to ascertain the distance from objects that are in the region of the surroundings scanned by the LIDAR sensor 2. FIG. 1 shows that the LIDAR sensor 2 of the vehicle emits a LIDAR signal 4 toward the front. In the detection region of the LIDAR signal 4, there is a further vehicle 3 in the present case, which means that parts of the LIDAR signal 4 can be scattered back from the vehicle 3 and detected by the LIDAR sensor 2.

In accordance with the preferred exemplary embodiment of the invention described in the present case, there is now in particular provision for the LIDAR sensor 2 to be operated in two different modes, specifically firstly in the aforementioned normal mode and secondly in a test mode. In the present case, the LIDAR sensor 2 is operated at full power in the normal mode, that is to say at maximum transmission power and with maximum reception sensitivity. In this way, there is the greatest maximum range of the LIDAR sensor 2, which, as depicted in FIG. 2, is sufficient to detect all of the objects 11, 12, 13 and 14 that are in the scanned surroundings of the LIDAR sensor 2. The fact that the objects 11, 12, 13 and 14 have been detected by the LIDAR sensor 2 is indicated in the present case by virtue of the objects 11, 12, 13 and 14 being depicted with shading.

So as now to ascertain how large the maximum range of the LIDAR sensor 2 actually is with certainty, the normal power for sending the LIDAR signal is reduced in the test mode schematically depicted in FIG. 3 to a test power that is only 30% of the normal power. The reception sensitivity remains the same in this case, that is to say does not differ from the normal sensitivity. This has the associated circumstance that it is no longer possible for all objects 11, 12, 13 and 14 to be detected by the LIDAR sensor. The reason is that the objects 13 and 14 are now outside the maximum range for the transmission power reduced to the test power, so that the objects 13 and 14 are no longer depicted with shading. Worded differently: the objects 13 and 14 are clearly outside the maximum range of the LIDAR sensor in the test mode, so that there is thus at any rate an upper limit for the maximum range of the LIDAR sensor in the test mode, since the distance of the objects 13 and 14 from the LIDAR sensor 2 is known on the basis of the measurement in the normal mode.

By using data, ascertained empirically beforehand and stored in a memory 5 of the LIDAR sensor 2, for the extent to which the maximum range decreases when the transmission power is reduced to 30% of the normal power, it is thus now possible to ascertain how great the maximum range of the LIDAR sensor actually is in the normal mode if the objects 13 and 14 at their distances from the LIDAR sensor 2 ascertained in the normal mode can no longer be detected in the test mode. Specifically, the distance of the object 12, as ascertained in the normal mode, which could only just be detected in the test mode, permits the determination of a lower limit for the maximum range of the LIDAR sensor in the normal mode. If this lower limit for the maximum range for the normal mode drops below a predetermined threshold, then, in accordance with the preferred exemplary embodiment of the invention described in the present case, appropriate countermeasures can be taken.

LIST OF REFERENCE SIGNS

1 Vehicle
2 LIDAR sensor
3 Further vehicle
4 LIDAR signal
5 Memory
11 Object
12 Object
13 Object
14 Object

The invention claimed is:

1. A method of operation for a LIDAR sensor comprising:
sending a LIDAR signal at a predetermined normal power and receiving a back-scattered component of the LIDAR signal with a predetermined normal sensitivity to ascertain the distance of objects present in the surroundings scanned by the LIDAR sensor in a normal mode,
wherein the normal mode is characterized by repeated interruption of the normal mode by a test mode,
wherein the test mode comprises the following steps:
sending a LIDAR signal at a test power, which is decreased by a predetermined amount in comparison with the predetermined normal power, and/or receiving the back-scattered component of the LIDAR signal with a test sensitivity, which is decreased by a predetermined amount in comparison with the predetermined normal sensitivity, and
ascertaining a value for the maximum range of the LIDAR sensor that is available in the normal mode of the LIDAR sensor on the basis of the distance, ascertained in the normal mode, of objects that are no longer detected in the test mode.

2. The method of operation for a LIDAR sensor according to claim 1, wherein the test power is decreased to a predetermined proportion of the normal power and/or in that the test sensitivity is decreased to a predetermined proportion of the normal sensitivity.

3. The method of operation for a LIDAR sensor according to claim 1, wherein the normal mode is interrupted by the test mode periodically.

4. The method of operation for a LIDAR sensor according to claim 1, wherein data for ascertaining the maximum range of the LIDAR sensor that is available in the normal mode of the LIDAR sensor on the basis of the distance, ascertained in the normal mode, of objects that are no longer detected in the test mode have been ascertained empirically beforehand.

5. The method of operation for a LIDAR sensor according to claim 1, wherein the method is performed in a vehicle.

6. A LIDAR sensor configured to:
send a LIDAR signal and receive a back-scattered component of the LIDAR signal so as, in a normal mode of the LIDAR sensor, to ascertain the distance of objects present in surroundings scanned by the LIDAR sensor,
wherein the LIDAR sensor is configured such that the LIDAR signal is sent at a predetermined normal power in the normal mode and the back-scattered component of the LIDAR signal is received with a predetermined normal sensitivity,
wherein the LIDAR sensor is additionally configured such that the normal mode is repeatedly interrupted by a test mode and that, in the test mode, a LIDAR signal is sent at a test power that is decreased by a predetermined amount in comparison with the predetermined normal power, and/or the back-scattered component of the LIDAR signal is received with a test sensitivity that is decreased by a predetermined amount in comparison with the predetermined normal sensitivity, and
wherein a value for the maximum range of the LIDAR sensor that is available in the normal mode of the LIDAR sensor is ascertained on the basis of the distance, ascertained in the normal mode, of objects that are no longer detected in the test mode.

7. The LIDAR sensor according to claim 6, wherein the LIDAR sensor is configured such that the test power is decreased to a predetermined proportion of the normal power and/or that the test sensitivity is decreased to a predetermined proportion of the normal sensitivity.

8. The LIDAR sensor according to claim 6, wherein the LIDAR sensor is configured such that the normal mode is interrupted by the test mode periodically.

9. The LIDAR sensor according to claim 6, wherein there is provision for a memory storing previously ascertained data for ascertaining the value for the maximum range of the LIDAR sensor that is available in the normal mode of the LIDAR sensor on the basis of the distance, ascertained in the normal mode, of objects that are no longer detected in the test mode.

* * * * *